US011754184B2

(12) United States Patent
Adachi

(10) Patent No.: US 11,754,184 B2
(45) Date of Patent: Sep. 12, 2023

(54) CRYOCOOLER AND SEALING COMPONENT

(71) Applicant: SUMITOMO HEAVY INDUSTRIES, LTD., Tokyo (JP)

(72) Inventor: Shuntaro Adachi, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 297 days.

(21) Appl. No.: 17/172,538

(22) Filed: Feb. 10, 2021

(65) Prior Publication Data

US 2021/0254718 A1    Aug. 19, 2021

(30) Foreign Application Priority Data

Feb. 13, 2020    (JP) ................................ 2020-022796

(51) Int. Cl.
*F16J 15/3268*    (2016.01)
*F25B 9/14*    (2006.01)
*F16J 15/00*    (2006.01)

(52) U.S. Cl.
CPC ......... *F16J 15/3268* (2013.01); *F16J 15/002* (2013.01); *F25B 9/145* (2013.01)

(58) Field of Classification Search
CPC .... F16J 15/3268; F16J 15/002; F16J 15/3208; F16J 15/3436
See application file for complete search history.

(56) References Cited

U.S. PATENT DOCUMENTS

| | | | | |
|---|---|---|---|---|
| 4,183,540 A | * | 1/1980 | Hytonen | F16J 15/40 277/408 |
| 5,230,498 A | * | 7/1993 | Wood | F16J 15/186 137/553 |
| 9,395,108 B2 | * | 7/2016 | Morie | F25B 9/14 |
| 10,260,639 B2 | * | 4/2019 | Jackson | F16C 33/74 |
| 2013/0086926 A1 | | 4/2013 | Xu | |
| 2014/0361207 A1 | | 12/2014 | Jackson et al. | |

FOREIGN PATENT DOCUMENTS

| | | | |
|---|---|---|---|
| CN | 103032986 A | | 4/2013 |
| CN | 104235486 A | | 12/2014 |
| JP | 06-015163 Y | * | 4/1994 |
| JP | H06-015163 Y2 | | 4/1994 |
| JP | 6017327 B2 | | 10/2016 |
| JP | 2017-142036 A | | 8/2017 |

OTHER PUBLICATIONS

Office Action issued in Chinese Application No. 202110076540.9, dated Apr. 6, 2022.

* cited by examiner

*Primary Examiner* — Lionel Nouketcha
(74) *Attorney, Agent, or Firm* — Michael Best & Friedrich LLP

(57) ABSTRACT

There is provided a cryocooler including a displacer, a displacer drive mechanism, a connecting rod that connects the displacer drive mechanism to the displacer, and a sealing component that supports the connecting rod to allow axial reciprocation thereof. The sealing component includes a bush through which the connecting rod is inserted and defining a radial clearance functioning as a non-contact seal between the connecting rod and the bush, a first contact seal held by the bush on a first side thereof toward the displacer drive mechanism with respect to the radial clearance, and sealing the radial clearance, and a second contact seal held by the bush on a second side thereof toward the displacer with respect to the radial clearance, and sealing the radial clearance.

10 Claims, 4 Drawing Sheets

CRYOCOOLER AND SEALING COMPONENT

RELATED APPLICATIONS

The content of Japanese Patent Application No. 2020-022796, on the basis of which priority benefits are claimed in an accompanying application data sheet, is in its entirety incorporated herein by reference.

BACKGROUND

Technical Field

Certain embodiments of the present invention relate to a cryocooler and a sealing component.

Description of Related Art

For example, a cryocooler such as a Gifford-McMahon (GM) cryocooler having a displacer that reciprocates to periodically change a volume of an expansion space of a working gas is known in the related art. A refrigeration cycle is configured in the cryocooler by causing a pressure in the expansion space to fluctuate in proper synchronization with periodic fluctuations in the volume of the expansion space.

As one of representative methods for driving reciprocation of the displacer, a type is known in which a drive source such as an electric motor is mechanically connected to the displacer by using a connecting rod. The connecting rod extends from an inside to an outside of a hermetic container accommodating the displacer and the expansion space by penetrating a rod insertion hole provided in a hermetic container. When the pressure in the expansion space decreases due to a leakage of the working gas from the hermetic container, cooling capacity of the cryocooler is degraded. Therefore, a sealing member is mounted on the rod insertion hole of the hermetic container to prevent the leakage of the working gas.

SUMMARY

According to an aspect of the present invention, a cryocooler includes a displacer, a displacer drive mechanism, a connecting rod that connects the displacer drive mechanism to the displacer, and a sealing component that supports the connecting rod to allow axial reciprocation thereof. The sealing component includes a bush through which the connecting rod is inserted and defining a radial clearance functioning as a non-contact seal between the connecting rod and the bush, a first contact seal held by the bush on a first side thereof toward the displacer drive mechanism with respect to the radial clearance, and sealing the radial clearance, and a second contact seal held by the bush on a second side thereof toward the displacer with respect to the radial clearance, and sealing the radial clearance.

According to an aspect of the present invention, a sealing component supports a connecting rod connecting a displacer drive mechanism to a displacer to allow axial reciprocation of the connecting rod. The sealing component includes a bush through which the connecting rod is inserted and defining a radial clearance functioning as a non-contact seal between the connecting rod and the bush, a first contact seal held by the bush on a first side thereof toward the displacer drive mechanism with respect to the radial clearance, and sealing the radial clearance, and a second contact seal held by the bush on a second side thereof toward the displacer with respect to the radial clearance, and sealing the radial clearance.

DETAILED DESCRIPTION

Figure 1:
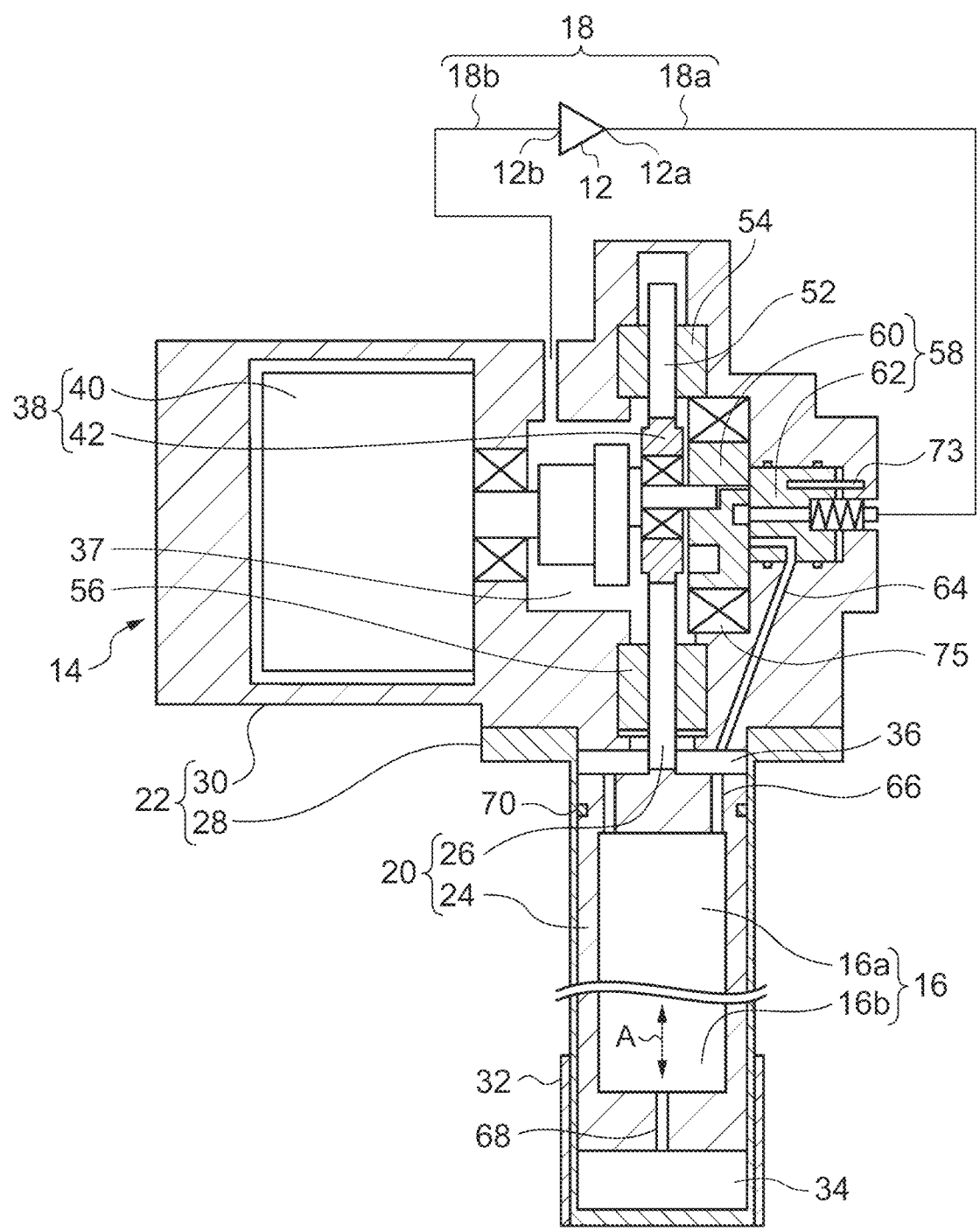
FIG. 1 is a view schematically illustrating a cryocooler according to an embodiment.

In the above-described cryocooler in the related art, when the displacer reciprocates, the connecting rod slides with respect to the sealing member of the rod insertion hole. As the cryocooler is operated for a long period of time, abrasion of the sealing member is gradually continued due to repeated sliding, and the sealing member may eventually lose sealing performance. For example, depending on operating conditions, the sealing member may seriously deteriorate due to continuous operations for several years. Deterioration of the sealing member results in the degraded cooling capacity of the cryocooler. Accordingly, it is undesirable that the sealing member deteriorates.

It is desirable to provide a cryocooler sealing component and a cryocooler including the sealing component, which are excellent in long-term reliability.

Any desired combination of the above-described components, and those in which the components or expressions according to the present invention are substituted from each other in methods, devices, or systems are effectively applicable as an aspect of the present invention.

According to an embodiment of the present invention, it is possible to provide a cryocooler sealing component and a cryocooler including the sealing component, which are excellent in long-term reliability.

Hereinafter, embodiments according to the present invention will be described in detail with reference to the drawings. In the description and the drawings, the same reference numerals will be assigned to the same or equivalent components, members, or processes, and repeated description will be omitted as appropriate. A scale or a shape of each illustrated element is set for convenience of description, and is not to be interpreted in a limited manner unless otherwise specified. The embodiments are merely examples, and do not limit the scope of the present invention in any way. All features and combination thereof which are described in the embodiments are not necessarily essential to the invention.

Figure 2:
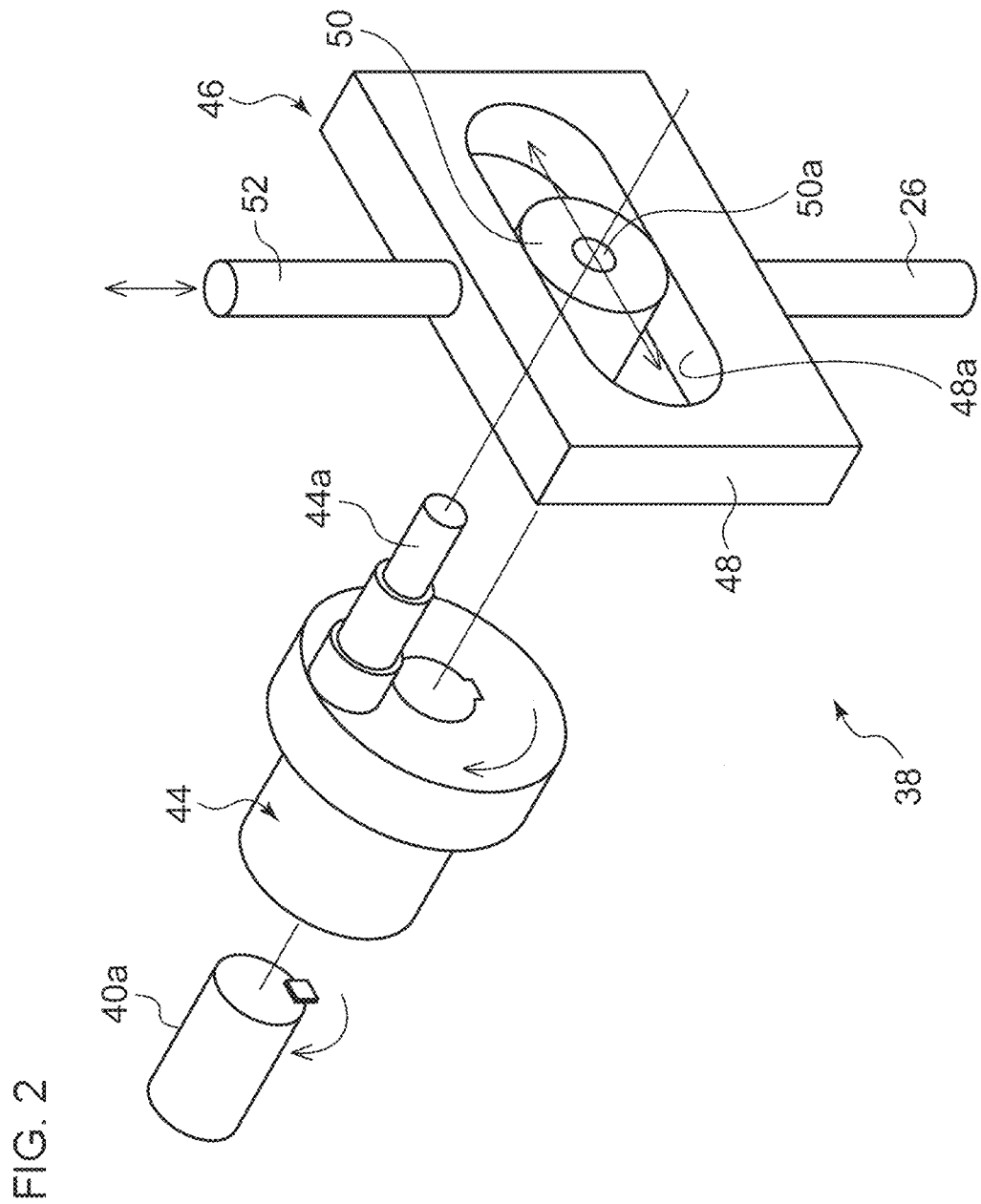
FIG. 2 is an exploded perspective view schematically illustrating a drive mechanism of an expander of the cryocooler illustrated in FIG. 1.

FIG. 1 is a view schematically illustrating a cryocooler according to an embodiment. FIG. 2 is an exploded perspective view schematically illustrating a drive mechanism of an expander of the cryocooler illustrated in FIG. 1.

A cryocooler 10 includes a compressor 12 that compresses a working gas (also referred to as a refrigerant gas) and an expander 14 that cools the working gas by adiabatic expansion. For example, the working gas is a helium gas. The expander 14 is also called a cold head. The expander 14 includes a regenerator 16 that pre-cools the working gas. The cryocooler 10 includes a gas pipe 18 including a first pipe 18a and a second pipe 18b, each of which connects the compressor 12 and the expander 14 to each other. The illustrated cryocooler 10 is a single-stage GM cryocooler.

As is known, the working gas having a first high pressure is supplied to the expander 14 from a discharge port 12a of the compressor 12 through the first pipe 18a. Due to the adiabatic expansion in the expander 14, the working gas is depressurized from the first high pressure to a second high pressure lower than the first high pressure. The working gas having the second high pressure is recovered to a suction port 12b of the compressor 12 from the expander 14 through the second pipe 18b. The compressor 12 compresses the recovered working gas having the second high pressure. In this way, the pressure of the working gas is raised again to the first high pressure. In general, both the first high pressure and the second high pressure are considerably higher than an atmospheric pressure. For convenience of description, the first high pressure and the second high pressure are simply called a high pressure and a low pressure, respectively. Usually, for example, the high pressure is 2 to 3 MPa, and for example, the low pressure is 0.5 to 1.5 MPa. For example, a differential pressure between the high pressure and the low pressure is approximately 1.2 to 2 MPa.

The expander 14 includes an expander movable section 20 and an expander stationary section 22. The expander movable section 20 is configured to be capable of reciprocating in an axial direction (upward-downward direction in FIG. 1) with respect to the expander stationary section 22. A moving direction of the expander movable section 20 is illustrated by an arrow A in FIG. 1. The expander stationary section 22 is configured to support the expander movable section 20 to be capable of reciprocating in the axial direction. In addition, the expander stationary section 22 is configured to serve as a hermetic container for accommodating the expander movable section 20 together with a high pressure gas (including a first high pressure gas and a second high pressure gas).

The expander movable section 20 includes a displacer 24 and a connecting rod 26 that drives reciprocation of the displacer 24. The regenerator 16 is incorporated in the displacer 24. An internal space of the displacer 24 is filled with a regenerator material, thereby forming the regenerator 16 inside the displacer 24. For example, the displacer 24 has a substantially columnar shape extending in the axial direction, and has an outer diameter and an inner diameter which are substantially uniform in the axial direction. Therefore, the regenerator 16 also has a substantially columnar shape extending in the axial direction.

The expander stationary section 22 has a two-part configuration broadly including a cylinder 28 and a drive mechanism housing 30. An axial upper portion of the expander stationary section 22 is the drive mechanism housing 30, and an axial lower portion of the expander stationary section 22 is the cylinder 28. Both are tightly coupled to each other. The cylinder 28 is configured to guide the reciprocation of the displacer 24. The cylinder 28 extends in the axial direction from the drive mechanism housing 30. The cylinder 28 has a substantially uniform inner diameter in the axial direction, and thus, the cylinder 28 has a substantially cylindrical inner surface extending in the axial direction. The inner diameter is slightly larger than the outer diameter of the displacer 24.

In addition, the expander stationary section 22 includes a cryocooler stage 32. The cryocooler stage 32 is fixed to an end of the cylinder 28 on a side opposite to the drive mechanism housing 30 in the axial direction. The cryocooler stage 32 is provided to conduct cold generated by the expander 14 to another object. The object is attached to the cryocooler stage 32, and is cooled by the cryocooler stage 32 during an operation of the cryocooler 10. The cryocooler stage 32 may be called a cooling stage or a heat load stage in some cases.

The cylinder 28 is divided into an expansion space 34 and an upper space 36 by the displacer 24. The displacer 24 defines the expansion space 34 between the cylinder 28 and the displacer 24 in one end in the axial direction, and defines the upper space 36 between the cylinder 28 and the displacer 24 in the other end in the axial direction. The expansion space 34 has a maximum volume at a top dead center of the displacer 24, and has a minimum volume at a bottom dead center of the displacer 24. The upper space 36 has a minimum volume at the top dead center of the displacer 24, and has a maximum volume at the bottom dead center of the displacer 24. The cryocooler stage 32 is fixed to the cylinder 28 to enclose the expansion space 34. The cryocooler stage 32 is thermally coupled to the expansion space 34.

During the operation of the cryocooler 10, the regenerator 16 has a regenerator high-temperature section 16a on one side (upper side in the drawing), and has a regenerator low-temperature section 16b on a side opposite thereto (lower side in the drawing) in the axial direction. As described above, the regenerator 16 has a temperature distribution in the axial direction. Other components (for example, the displacer 24 and the cylinder 28) of the expander 14 surrounding the regenerator 16 similarly have the temperature distribution in the axial direction. Accordingly, during the operation, the expander 14 has a high-temperature section on one side in the axial direction, and has a low-temperature section on the other side in the axial direction. For example, the high-temperature section has a temperature substantially corresponding to a room temperature. For example, although a case depends on a usage of the cryocooler 10, the low-temperature section is cooled to a certain temperature included in a range of approximately 100K to 10K.

In the description herein, the terms such as the axial direction, the radial direction, and the circumferential direction are used for convenience of description. As illustrated by an arrow A, the axial direction represents a moving direction of the expander movable section 20 with respect to the expander stationary section 22. The radial direction represents a direction perpendicular to the axial direction (horizontal direction in the drawing), and the circumferential direction represents a direction surrounding the axial direction. A certain element of the expander 14 which is relatively close to the cryocooler stage 32 in the axial direction will be called a "lower part", and a certain element which is relatively far will be called an "upper part" in some cases. Therefore, the high-temperature section and the low-temperature section of the expander 14 are respectively located in the upper part and the lower part in the axial direction. The expressions are merely used to facilitate understanding of a relative positional relationship between the elements of the expander 14, and not relate to disposition of the expander 14 when the expander 14 is installed on a jobsite. For example, the expander 14 may be installed in a state where the cryocooler stage 32 faces upward and the drive mechanism housing 30 faces downward. Alternatively, the expander 14 may be installed so that the axial direction coincides with the horizontal direction.

The expander 14 includes a displacer drive mechanism 38 supported by the expander stationary section 22 to drive the displacer 24. For example, the displacer drive mechanism 38 includes a motor 40 such as an electric motor and a scotch yoke mechanism 42. The connecting rod 26 forms a portion of the scotch yoke mechanism 42. The connecting rod 26 is connected to the scotch yoke mechanism 42 to be driven in the axial direction by scotch yoke mechanism 42. The connecting rod 26 has a diameter smaller than that of the displacer 24. For example, the diameter of the connecting rod 26 is smaller than half of the diameter of the displacer 24.

The displacer drive mechanism 38 is accommodated in a low pressure gas chamber 37 defined inside the drive mechanism housing 30. The second pipe 18b is connected to the drive mechanism housing 30, thereby causing the low pressure gas chamber 37 to communicate with the suction port 12b of the compressor 12 through the second pipe 18b. Therefore, the low pressure gas chamber 37 is always maintained at a low pressure.

As illustrated in FIG. 2, the scotch yoke mechanism 42 includes a crank 44 and a scotch yoke 46. The crank 44 is fixed to a rotary shaft 40a of the motor 40. The crank 44 has a crank pin 44a at a position eccentric from a position where the rotary shaft 40a is fixed. Therefore, when the crank 44 is fixed to the rotary shaft 40a, the crank pin 44a extends parallel to the rotary shaft 40a of the motor 40, and is brought into a state of being eccentric from the rotary shaft 40a.

The scotch yoke 46 includes a yoke plate 48 and a roller bearing 50. The yoke plate 48 is a plate-shaped member. In the scotch yoke 46, an upper rod 52 is connected to an upper center thereof to extend upward, and the connecting rod 26 is connected to a lower center thereof to extend downward. A horizontally long window 48a is formed in the center of the yoke plate 48. The horizontally long window 48a extends in a direction intersecting with an extending direction (that is, the axial direction) of the upper rod 52 and the connecting rod 26, for example, in a direction orthogonal to the extending direction. The roller bearing 50 is disposed to be rollable inside the horizontally long window 48a. An engagement hole 50a that engages with the crank pin 44a is formed in the center of the roller bearing 50, and the crank pin 44a penetrates the engagement hole 50a.

When the motor 40 is driven to rotate the rotary shaft 40a, the roller bearing 50 engaging with the crank pin 44a rotates in a circular motion. As the roller bearing 50 rotates in the circular motion, the scotch yoke 46 reciprocates in the axial direction. In this case, the roller bearing 50 reciprocates inside the horizontally long window 48a in the direction intersecting with the axial direction.

As illustrated in FIG. 1, the connecting rod 26 connects the displacer drive mechanism 38 to the displacer 24. The connecting rod 26 extends from the low pressure gas chamber 37 to the displacer 24 by penetrating the upper space 36. Therefore, as the scotch yoke 46 moves in the axial direction, the displacer 24 reciprocates inside the cylinder 28 in the axial direction.

As illustrated in FIG. 1, a sliding bearing 54 and a sealing component 56 are provided in the drive mechanism housing 30 of the expander stationary section 22. The upper rod 52 is supported to be movable in the axial direction by the sliding bearing 54, and the connecting rod 26 is supported to be movable in the axial direction by the sealing component 56. Therefore, the upper rod 52, the connecting rod 26, the yoke plate 48, and the scotch yoke 46 are configured to be movable in the axial direction.

As will be described in detail later, since the sealing component 56 is provided, the drive mechanism housing 30 is configured to be hermetical with respect to the cylinder 28. Therefore, the low pressure gas chamber 37 is isolated from the upper space 36. There is no direct gas flow between the low pressure gas chamber 37 and the upper space 36.

The expander 14 includes a rotary valve 58 that switches between an intake process and an exhaust process of the expansion space 34 in synchronization with axial reciprocation of the displacer 24. The rotary valve 58 functions as a portion of a supply path for supplying the high pressure gas to the expansion space 34, and functions as a portion of a discharge path for discharging the low pressure gas from the expansion space 34. The rotary valve 58 switches between a supply function and a discharge function of the working gas in synchronization with the reciprocation of the displacer 24. In this manner, the rotary valve 58 is configured to control the pressure in the expansion space 34. The rotary valve 58 is connected to the displacer drive mechanism 38, and is accommodated in the drive mechanism housing 30.

In addition, the expander 14 has a housing gas flow path 64, a displacer upper lid gas flow path 66, and a displacer lower lid gas flow path 68. The high pressure gas flows from the first pipe 18a into the expansion space 34 via the rotary valve 58, the housing gas flow path 64, the upper space 36, the displacer upper lid gas flow path 66, the regenerator 16, and the displacer lower lid gas flow path 68. The gas returning from the expansion space 34 is received by the low pressure gas chamber 37 via the displacer lower lid gas flow path 68, the regenerator 16, the displacer upper lid gas flow path 66, the upper space 36, the housing gas flow path 64, and the rotary valve 58.

The housing gas flow path 64 is formed to penetrate the drive mechanism housing 30 to allow the gas flow between the expander stationary section 22 and the upper space 36.

The upper space 36 is formed between the expander stationary section 22 and the displacer 24 on the side of the regenerator high-temperature section 16a. More specifically, the upper space 36 is pinched between the drive mechanism housing 30 and the displacer 24 in the axial direction, and is surrounded by the cylinder 28 in the circumferential direction. The upper space 36 is adjacent to the low pressure gas chamber 37. The upper space 36 is also called a room temperature chamber. The upper space 36 has a variable volume formed between the expander movable section 20 and the expander stationary section 22.

The displacer upper lid gas flow path 66 is at least one opening of the displacer 24 which is formed to cause the regenerator high-temperature section 16a to communicate with the upper space 36. The displacer lower lid gas flow path 68 is at least one opening of the displacer 24 which is formed to cause the regenerator low-temperature section 16b to communicate with the expansion space 34. A seal portion 70 for sealing a clearance between the displacer 24 and the cylinder 28 is provided on a side surface of the displacer 24. The seal portion 70 may be attached to the displacer 24 to surround the displacer upper lid gas flow path 66 in the circumferential direction.

The expansion space 34 is formed between the cylinder 28 and the displacer 24 on the side of the regenerator low-temperature section 16b. The expansion space 34 has a variable volume formed between the expander movable section 20 and the expander stationary section 22 as in the upper space 36. A volume of the expansion space 34 fluctuates complementarily with a volume of the upper space 36 due to relative movement of the displacer 24 with respect to the cylinder 28. Since the seal portion 70 is provided, there is no direct gas flow (that is, no gas flow that bypasses the regenerator 16) between the upper space 36 and the expansion space 34.

The rotary valve 58 includes a rotor valve member 60 and a stator valve member 62. The rotor valve member 60 is connected to the rotary shaft 40a of the motor 40 to rotate by the rotation of the motor 40. The rotor valve member 60 is in surface contact with the stator valve member 62 to rotationally slide with respect to the stator valve member 62. The rotor valve member 60 is supported to be rotatable inside the drive mechanism housing 30 by a rotor valve bearing 75 illustrated in FIG. 1. The stator valve member 62 is fixed inside the drive mechanism housing 30 by a stator valve fixing pin 73. The stator valve member 62 is configured to receive the high pressure gas entering the drive mechanism housing 30 from the first pipe 18a.

Figure 3:
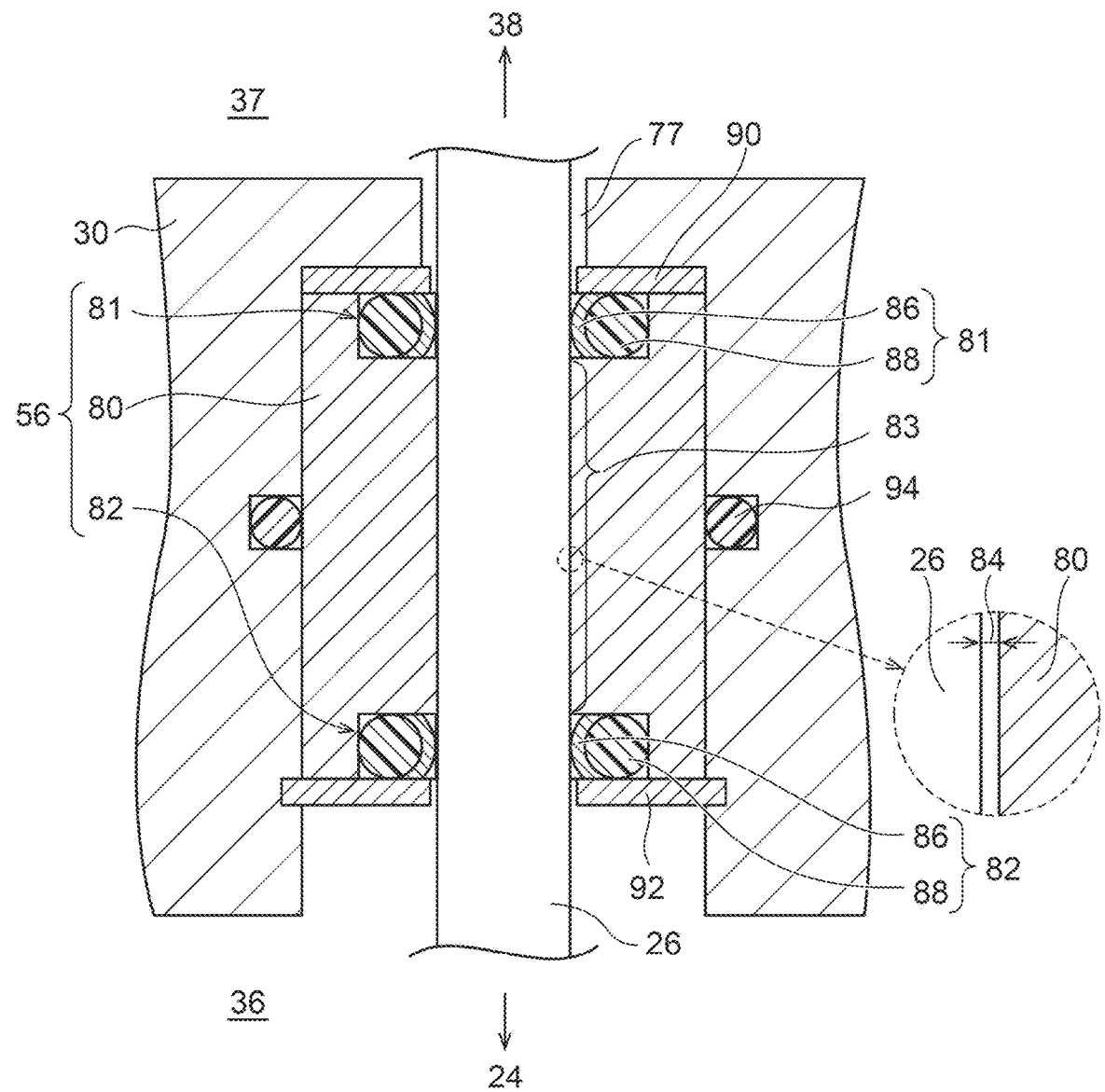
FIG. 3 is a view schematically illustrating a sealing component mounted on the cryocooler illustrated in FIG. 1.

FIG. 3 is a view schematically illustrating the sealing component 56 mounted on the cryocooler illustrated in FIG. 1. The sealing component 56 supports the connecting rod 26 to be capable of reciprocating in the axial direction. The connecting rod 26 penetrates a rod insertion hole 77 provided in a lower end portion of the drive mechanism housing 30, and extends to the upper space 36 from the low pressure gas chamber 37.

The sealing component 56 includes a bush 80, a first contact seal 81, and a second contact seal 82. The first contact seal 81 and the second contact seal 82 are mounted on the bush 80, and the sealing component 56 is configured to serve as a single component (as a so-called sub-assembly).

The bush 80 is a cylindrical member into which the connecting rod 26 is inserted. Since the connecting rod 26 has an elongated columnar shape, the bush 80 is correspondingly formed into a cylindrical shape surrounding the connecting rod 26. The bush 80 has a first annular recessed portion for accommodating the first contact seal 81 and a second annular recessed portion for accommodating the second contact seal 82. On an inner peripheral surface of the bush 80, the two annular recess portions are formed in end portions in the axial direction on sides opposite to each other in the bush 80.

The bush 80 is formed of a resin material. The connecting rod 26 that slides with respect to the bush 80 is typically formed of a metal material such as stainless steel, for example. Therefore, since the bush 80 is formed of a resin material, it is possible to prevent or reduce abrasion of or damage to the connecting rod 26 during contact or interference with the bush 80 which may occur when the connecting rod 26 slides. For example, the bush 80 may be formed of a fluororesin such as polytetrafluoroethylene, or other synthetic resin materials which are excellent in slidability and/or durability. In this case, it is possible to prevent or reduce the abrasion of or the damage to the bush 80 which is caused by the sliding of the connecting rod 26.

A radial clearance 84 functioning as a non-contact seal 83 is defined between the bush 80 and the connecting rod 26. The radial clearance 84 corresponds to half of a difference between the inner diameter of the bush 80 and the outer diameter of the connecting rod 26. The radial clearance 84 seals a gas flow between the low pressure gas chamber 37 and the upper space 36, even when the first contact seal 81 and the second contact seal 82 are not provided on the bush 80. A reduced dimension of the radial clearance 84 is defined to such an extent that the dimension does not substantially affect refrigeration performance of the cryocooler 10. For example, the radial clearance 84 may be set in a range of 5 μm to 30 μm. Alternatively, for example, a ratio of the radial clearance 84 to the diameter of the connecting rod 26 may be set in a range of 0.005 to 0.03.

An axial length of the bush 80 (that is, the sealing component 56) may be longer than at least half of an axial length of the rod insertion hole 77 (or the thickness of the drive mechanism housing 30), or may be substantially a total length of the axial length of the rod insertion hole 77, for example. Since the axial length of the bush 80 is lengthened in this way, the non-contact seal 83 can be lengthened. Accordingly, sealing performance of the non-contact seal 83 is improved. When allowed, the bush 80 may extend to exceed the axial length of the rod insertion hole 77, and may extend inside the low pressure gas chamber 37, for example. However, in order to avoid interference with the displacer drive mechanism 38 such as the scotch yoke mechanism 42 disposed inside the low pressure gas chamber 37, it is desirable that the axial length of the bush 80 does not exceed the axial length of the rod insertion hole 77.

The first contact seal 81 is held by the bush 80 on the displacer drive mechanism 38 side with respect to the radial clearance 84, and seals the radial clearance 84. The second contact seal 82 is held by the bush 80 on the displacer 24 side with respect to the radial clearance 84, and seals the radial clearance 84.

The first contact seal 81 is held by the bush 80 in the axial direction above an intermediate portion of the axial length of the bush 80, and the second contact seal 82 is held by the bush 80 in the axial direction below the intermediate portion of the axial length of the bush 80. For example, the first contact seal 81 is held by a first axial end portion of the bush 80, the second contact seal 82 is held by a second axial end portion on a side opposite to the first axial end portion of the bush 80.

The first contact seal 81 includes a seal ring 86 that comes into contact with the connecting rod 26, and a back ring 88 disposed between the seal ring 86 and the bush 80 to press the seal ring 86 against the connecting rod 26. Similarly, the second contact seal 82 includes the seal ring 86 and the back ring 88. In this way, a so-called slipper seal is adopted for the first contact seal 81 and the second contact seal 82. The seal ring 86 is formed of a fluororesin such as polytetrafluoroethylene, or other synthetic resin materials which are excellent in slidability and/or durability. For example, the back ring 88 may be an O-ring or a synthetic rubber ring. At least one of the first contact seal 81 and the second contact seal 82 may not be the slipper seal, and may be another sealing member such as the O-ring.

The sealing component 56 is designed so that the bush 80 is not substantially deformed by a reaction force received from the first contact seal 81 when the first contact seal 81 (or the second contact seal 82) is mounted. Therefore, for example, stiffness of the first annular recessed portion of the bush 80 (or the axial end portion of the bush 80) accommodating the first contact seal 81 may be higher than stiffness of the first contact seal 81 (for example, stiffness of the seal ring 86). In addition, the stiffness of the seal ring 86 may be higher than the stiffness of the back ring 88.

When the stiffness of the bush 80 is insufficient, the axial end portion of the bush 80 may be deformed by an elastic restoring force that tries to enlarge the diameter of the first contact seal 81 in the first annular recessed portion of the bush 80. Deformation of the bush 80 changes the radial clearance 84, which may adversely affect the sealing performance of the non-contact seal 83 or the sliding of the connecting rod 26. However, in this embodiment, the bush 80 has sufficient stiffness. Accordingly, the radial clearance 84 is held. The sealing performance or the sliding is not adversely affected too much or minimized.

The inner diameter of the back ring 88 may be larger than the inner diameter of the bush 80 (inner diameter of the bush 80 in the radial clearance 84). In this manner, when the seal ring 86 is not mounted on the sealing component 56, the connecting rod 26 comes into contact with the inner peripheral surface of the bush 80 instead of the back ring 88. In this case, even when the seal ring 86 is subjected to abrasion (is lost) due to a long-term operation of the cryocooler 10, the sliding of the connecting rod 26 can be supported by the bush 80. Although strength depends on a selected material, the bush 80 typically has more excellent strength than the back ring 88. It is possible to avoid damage to the back ring 88 or accompanying generation of a foreign matter during contact between the back ring 88 and the connecting rod 26, which may occur after the abrasion of the seal ring 86.

An axial distance from the first contact seal 81 to the second contact seal 82, that is, the axial length of the non-contact seal 83 may be longer than a distance from the first contact seal 81 to an inner surface of the drive mechanism housing 30 on the low pressure gas chamber 37 side. Similarly, the axial length of the non-contact seal 83 may be longer than a distance from the second contact seal 82 to a surface of the drive mechanism housing 30 facing the upper space 36. The axial length of the non-contact seal 83 may be longer than at least half of the axial length of the bush 80. Since the non-contact seal 83 is lengthened in this way, the sealing performance of the non-contact seal 83 can be improved.

It is not essential that the first contact seal 81 and the second contact seal 82 are disposed at an end in the axial direction of the bush 80. The bush 80 may extend upward in the axial direction beyond the first contact seal 81. The bush 80 may extend downward in the axial direction beyond the second contact seal 82. In this case, a radial clearance functioning as an additional non-contact seal may be formed between the bush 80 and the connecting rod 26 above the first contact seal 81 in the axial direction. Similarly, a radial clearance functioning as an additional non-contact seal may be formed between the bush 80 and the connecting rod 26 below the second contact seal 82 in the axial direction.

The sealing component 56 is mounted on the drive mechanism housing 30 in the rod insertion hole 77. An upper washer 90 is adjacent to an upper end of the sealing component 56, and is pinched between the drive mechanism housing 30 and the sealing component 56. The first contact seal 81 is pinched and held between the bush 80 and the upper washer 90 in the axial direction. In addition, a lower washer 92 is adjacent to a lower end of the sealing component 56, and is pinched between the drive mechanism housing 30 and the sealing component 56. The second contact seal 82 is pinched and held between the bush 80 and the lower washer 92 in the axial direction. For example, the lower washer 92 may be a C-shaped retaining ring, and holds the sealing component 56 in the drive mechanism housing 30 so that the sealing component 56 does not fall to the upper space 36 from the drive mechanism housing 30.

In addition, a sealing member 94 such as an O-ring is mounted between a recessed portion of the drive mechanism housing 30 receiving the sealing component 56 and the outer peripheral surface of the bush 80. The sealing member 94 prevents a gas leakage to the outside of the sealing component 56.

Hitherto, a configuration of the cryocooler 10 according to the embodiment has been described. Subsequently, an operation thereof will be described. When the displacer 24 is located at or near a bottom dead center, the rotary valve 58 is switched to connect the discharge port 12a of the compressor 12 to the expansion space 34, and an intake process of a refrigeration cycle starts. The high pressure gas enters the regenerator high-temperature section 16a from the rotary valve 58 through the housing gas flow path 64, the upper space 36, and the displacer upper lid gas flow path 66. The gas is cooled while passing through the regenerator 16, and enters the expansion space 34 from the regenerator low-temperature section 16b through the displacer lower lid gas flow path 68. While the gas flows into the expansion space 34, the displacer 24 moves upward in the axial direction inside the cylinder 28 from the bottom dead center to a top dead center. In this manner, a volume of the expansion space 34 increases. In this way, the expansion space 34 is filled with the high pressure gas.

When the displacer 24 is located at or near the top dead center, the rotary valve 58 is switched to connect the suction port 12b of the compressor 12 to the expansion space 34, and an exhaust process of the refrigeration cycle starts. In this case, the high pressure gas inside the expansion space 34 is expanded and cooled. The expanded gas enters the regenerator 16 from the expansion space 34 through the displacer lower lid gas flow path 68. The gas is cooled while passing through the regenerator 16. The gas returns from the regenerator 16 to the compressor 12 via the housing gas flow path 64, the rotary valve 58, and the low pressure gas chamber 37. While the gas flows out of the expansion space 34, the displacer 24 moves downward in the axial direction inside the cylinder 28 from the top dead center to the bottom dead center. In this manner, the volume of the expansion space 34 decreases, and the low pressure gas is discharged from the expansion space 34. When the exhaust process is completed, the intake process starts again.

The sealing component 56 is provided between the drive mechanism housing 30 and the connecting rod 26, and the upper space 36 and the expansion space 34 are sealed from the low pressure gas chamber 37. Accordingly, there is no substantial gas leakage from the upper space 36 and the expansion space 34 to the low pressure gas chamber 37.

The above-described configuration is one refrigeration cycle in the cryocooler 10. The cryocooler 10 cools the cryocooler stage 32 to a desired temperature by repeating the refrigeration cycle. Therefore, the cryocooler 10 can cool an object thermally coupled to the cryocooler stage 32 to a cryogenic temperature.

According to the embodiment, the sealing component 56 includes the first contact seal 81 and the second contact seal 82. Accordingly, in a newly manufactured cryocooler 10, the two contact seals effectively function for a while (for example, for approximately several years) from the start of the operation. A load received by each of the two contact seals is approximately half of a load received by a seal portion according to a comparative example having only one contact-type seal. A progress of the abrasion of the first contact seal 81 and the second contact seal 82 which is caused by the sliding with the connecting rod 26 can be delayed, and the sealing performance of the two contact seals can be maintained for a long period of time.

During the operation of the cryocooler 10, a pressure around the displacer 24, that is, a pressure in the upper space 36 and the expansion space 34 periodically fluctuates between a first pressure (high pressure) and a second pressure (low pressure) lower than the first pressure. A pressure around the displacer drive mechanism 38, that is, the pressure in the low pressure gas chamber 37 is maintained at the second pressure. The non-contact seal 83 has an intermediate pressure between the first pressure and the second pressure. Therefore, compared to a comparative example having only one contact-type seal, a differential pressure acting on each of the first contact seal 81 and the second contact seal 82 is approximately half of a differential pressure in the comparative example. A load acting on the first contact seal 81 and the second contact seal 82 is reduced by half, thereby leading to a longer life of the first contact seal 81 and the second contact seal 82.

In addition, even when the first contact seal 81 and the second contact seal 82 are subjected to abrasion after a long period of the operation of the cryocooler 10, the sealing performance of the sealing component 56 is not lost since the sealing component 56 has the non-contact seal 83. Compared to when the two contact seals effectively function, the sealing performance of the non-contact seal 83 alone may be somewhat inferior. However, the non-contact seal 83 can be designed not to significantly impair the refrigeration performance of the cryocooler 10. In the comparative example having only one contact-type seal, the refrigeration performance may be significantly degraded immediately when the contact-type seal is subjected to abrasion. However, according to the embodiment, the disadvantage is eliminated or alleviated.

Therefore, the sealing component 56 according to the embodiment has a design which is robust against abrasion of a contact-type sealing member. According to the embodiment, it is possible to provide the cryocooler sealing component 56 and the cryocooler 10 including the sealing component 56, which are excellent in long-term reliability.

Figure 4:
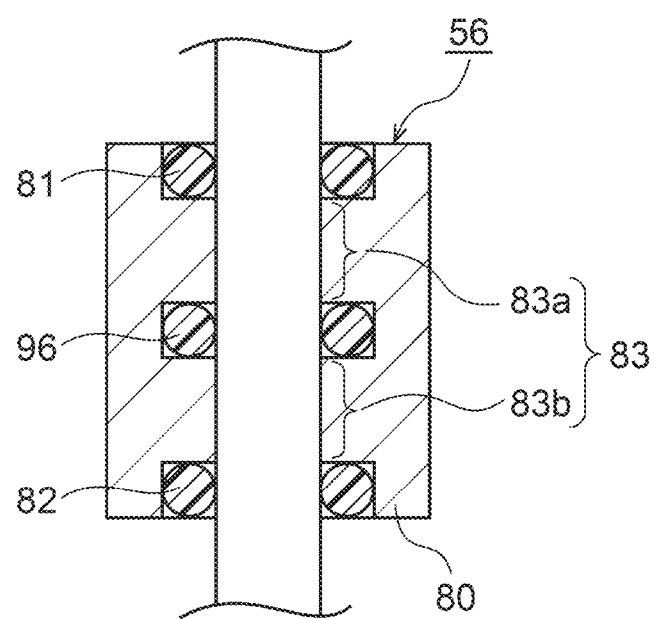
FIG. 4 is a view illustrating another example of the sealing component.

FIG. 4 is a view illustrating another example of the sealing component 56. As illustrated, the sealing component 56 may further include an intermediate contact seal 96 held by the bush 80 between the first contact seal 81 and the second contact seal 82 to divide the non-contact seal 83 in the axial direction. The non-contact seal 83 is divided into a first portion 83*a* and a second portion 83*b* by the intermediate contact seal 96. Since an additional contact seal is provided in this way, a load on each contact seal is further reduced.

Hitherto, the present invention has been described, based on the embodiment. The present invention is not limited to the above-described embodiment. It will be understood by those skilled in the art that various design changes can be made, various modification examples can be made, and the modification examples also fall within the scope of the present invention. Various features described with regard to a certain embodiment are also applicable to other embodiments. A new embodiment acquired from the combination compatibly achieves respective advantageous effects of the combined embodiment.

In a certain embodiment, the sealing component 56 may be mounted on the drive mechanism housing 30 as a sliding bearing 54 that supports the upper rod 52 to be slidable.

In a certain embodiment, the high pressure working gas may be introduced into the drive mechanism housing 30, and the displacer drive mechanism 38 may be disposed in the high pressure gas chamber. In this case, during the operation of the cryocooler, the pressure around the displacer periodically fluctuates between the first pressure and the second pressure lower than the first pressure, and the pressure around the displacer drive mechanism is maintained at the first pressure. Even in this way, as in the above-described embodiment, the non-contact seal 83 can have the intermediate pressure between the first pressure and the second pressure.

In the above-described embodiment, a case where the displacer drive mechanism 38 includes the scotch yoke mechanism 42 has been described as an example. However, other types of the displacer drive mechanism are also applicable. For example, the cryocooler 10 may be a so-called gas-driven GM cryocooler in which the displacer 24 is driven by a gas pressure. In this case, the connecting rod 26 extending from the displacer 24 is rigidly connected to a drive piston instead of the scotch yoke mechanism 42. The drive piston may be accommodated in the drive mechanism housing 30. The pressure acting on the drive piston is controlled so that the displacer 24 reciprocates in the axial direction by a pressure difference between the pressure acting on the drive piston and the pressure acting on the displacer 24. The pressure acting on the drive piston can usually be controlled by using the rotary valve 58, for example. As in the above-described embodiment, the connecting rod 26 is supported by the sealing component 56 to be movable in the axial direction. At the same time, the pressure difference that causes the displacer 24 to reciprocate in the axial direction is maintained by the sealing component 56.

Hitherto, the embodiment has been described with reference to the single-stage GM cryocooler. The present invention is not limited thereto, and the sealing component 56 according to the embodiment is applicable to a two-stage or multi-stage GM cryocooler, or another cryocooler having the connecting rod for connecting the displacer drive mechanism to the displacer.

The present invention has been described by using specific terms and phrases, based on the embodiments. However, the embodiment shows only one aspect of principles and applications of the present invention. The embodiment allows many modification examples and disposition changes within the scope not departing from the idea of the present invention defined in the appended claims.

It should be understood that the invention is not limited to the above-described embodiment, but may be modified into various forms on the basis of the spirit of the invention. Additionally, the modifications are included in the scope of the invention.

What is claimed is:

1. A cryocooler comprising:
    a displacer;
    a connecting rod connected to the displacer; and
    a sealing component that supports the connecting rod to allow axial reciprocation thereof, wherein the sealing component includes
        a bush through which the connecting rod is inserted and defining a radial clearance functioning as a non-contact seal between the connecting rod and the bush,
        a first contact seal held by the bush on a first side thereof away from the displacer with respect to the radial clearance, the first contract seal sealing the radial clearance, and
        a second contact seal held by the bush on a second side thereof toward the displacer with respect to the radial clearance, the second contact seal sealing the radial clearance, and
        wherein the bush is furnished with at least one of:
        a first annular recess formed on a first axial outermost end surface of the bush and accommodating the first contact seal, and
        a second annular recess formed on a second axial outermost end surface of the bush and accommodating the second contact seal.

2. The cryocooler according to claim 1,
    wherein during an operation of the cryocooler, a pressure around the displacer periodically fluctuates between a first pressure and a second pressure lower than the first pressure, and a pressure around an end of the connecting rod away from the displacer is maintained at either the first pressure or the second pressure, and the non-contact seal has an intermediate pressure between the first pressure and the second pressure.

3. The cryocooler according to claim 1, wherein at least one of the first contact seal and the second contact seal includes a seal ring in contact with the connecting rod, and a back ring disposed between the seal ring and the bush to press the seal ring against the connecting rod.

4. The cryocooler according to claim 3, wherein an inner diameter of the back ring is larger than an inner diameter of the bush in the radial clearance.

5. The cryocooler according to claim 1, wherein the bush is formed of a resin material.

6. The cryocooler according to claim 1, wherein the sealing component further includes an intermediate contact seal held by the bush between the first contact seal and the second contact seal to axially divide the non-contact seal into portions.

7. The cryocooler according to claim 1, further comprising:

a first washer axially adjacent to the first axial end surface of the bush, wherein the first contact seal is pinched and held between the first washer and the first axial end surface of the bush.

8. The cryocooler according to claim 1, further comprising:

a second washer axially adjacent to the second axial end surface of the bush, wherein the second contact seal is pinched and held between the second washer and the second axial end surface of the bush.

9. The cryocooler according to claim 1, further comprising:

a housing that supports the sealing component, and a sealing component retainer that holds the sealing component to the housing and prevents the sealing component from falling into a space axially adjacent to the displacer.

10. A sealing component that supports a connecting rod connected to a displacer, the sealing component allowing axial reciprocation of the connecting rod, the sealing component comprising:

a bush through which the connecting rod is inserted and defining a radial clearance functioning as a non-contact seal between the connecting rod and the bush;

a first contact seal held by the bush on a first side thereof away from the displacer with respect to the radial clearance, the first contact seal sealing the radial clearance; and a second contact seal held by the bush on a second side thereof toward the displacer with respect to the radial clearance, the second contact seal sealing the radial clearance, wherein the bush is furnished with at least one of:

a first annular recess formed on a first axial outermost end surface of the bush and accommodating the first contact seal, and a second annular recess formed on a second axial outermost end surface of the bush and accommodating the second contact seal.

* * * * *